(12) United States Patent
Reeves

(10) Patent No.: US 11,327,349 B2
(45) Date of Patent: May 10, 2022

(54) METHOD OF ASSEMBLING CURVED DISPLAY DEVICES

(71) Applicant: Flexenable Limited, Cambridge (GB)

(72) Inventor: William Henry Reeves, Cambridge (GB)

(73) Assignee: Flexenable Limited, Cambridge (GB)

( * ) Notice: Subject to any disclaimer, the term of this patent is extended or adjusted under 35 U.S.C. 154(b) by 61 days.

(21) Appl. No.: 16/645,233

(22) PCT Filed: Sep. 5, 2018

(86) PCT No.: PCT/EP2018/073817
§ 371 (c)(1),
(2) Date: Mar. 6, 2020

(87) PCT Pub. No.: WO2019/048452
PCT Pub. Date: Mar. 14, 2019

(65) Prior Publication Data
US 2020/0257156 A1 Aug. 13, 2020

(30) Foreign Application Priority Data
Sep. 6, 2017 (GB) ...................................... 1714297

(51) Int. Cl.
*G02F 1/1333* (2006.01)
(52) U.S. Cl.
CPC .... *G02F 1/133305* (2013.01); *G02F 1/13338* (2013.01); *G02F 2202/28* (2013.01)
(58) Field of Classification Search
None
See application file for complete search history.

(56) References Cited

U.S. PATENT DOCUMENTS

| 2009/0161048 | A1 | 6/2009 | Satake et al. |
| 2012/0020056 | A1 | 1/2012 | Yamagata et al. |
| 2013/0161684 | A1 | 6/2013 | Momma et al. |
| 2014/0045283 | A1 | 2/2014 | Hirakata et al. |
| 2015/0324045 | A1 | 11/2015 | Chi et al. |
| 2017/0153494 | A1* | 6/2017 | Park ................... G02F 1/133512 |

OTHER PUBLICATIONS

Great Britain Search Report from GB Patent Application No. 1714297.7, dated Feb. 8, 2018.
Search Report and Written Opinion from International Patent Application No. PCT/EP2018/073817, dated Dec. 10, 2018.

* cited by examiner

*Primary Examiner* — Richard H Kim
(74) *Attorney, Agent, or Firm* — Dergosits & Noah LLP; Todd A. Noah

(57) ABSTRACT

Described are methods for assembling a display device by forcibly flexing a first component to conform to a curved surface, adhering the first component to the curved surface, forcibly flexing a second component to conform to an outer surface of the first component and adhering the second component to the first component. The first and second components each comprise at least one of: i) a touch sensor component or a component film of a touch sensor component; ii) at least one pair of orthogonal polariser sheets; iii) a liquid crystal cell comprising liquid crystal material contained between two containing films; iv) at least one encapsulation film; v) at least one diffuser sheet; vi) a backlight component; vii) a light-emitting diode unit; and viii) a circular polariser component, or a component film thereof, for use with a light-emitting diode unit.

16 Claims, 9 Drawing Sheets

METHOD OF ASSEMBLING CURVED DISPLAY DEVICES

CLAIM OF PRIORITY

This application is a U.S. National Phase of International Patent Application No. PCT/EP2018/073817, filed Sep. 5, 2018, which claims priority to Great Britain Patent Application No. 1714297.7, filed Sep. 6, 2017, the contents of which are hereby incorporated by reference in their entireties.

Curved displays are of increasing interest in a wide variety of fields.

The inventors for the present application have carried out extensive work on producing curved display devices. The inventors for the present application have identified several technical problems and have devised solutions to those technical problems.

For example, one technique for producing a curved display device involves laminating components of a display device (such as a touch sensor component, two orthogonal polarisers and the LC cell including control circuitry etc. in the case of a liquid crystal display (LCD) device; or a touch sensor component, a circular polariser component, and light-emitting unit including control circuitry etc. in the case of a light-emitting diode (LED) device) together in a naturally flat configuration, and forcibly flexing the whole assembly to laminate the whole assembly to a curved support component. The inventors for the present application have identified the problem of a potential reduction in viewing quality in at least some regions of the display area upon laminating the naturally flat device assembly to a curved support component, and have worked on a solution to this problem.

Also, reflections at the display device outer surface can have a greater impact on the viewing experience for curved displays than for flat displays, and the inventors for the present application have worked on devising a production technique that facilitates the production of curved display devices exhibiting good viewing quality in highly directional lighting conditions.

There is hereby provided a method of assembling a display device, comprising: forcibly flexing a first component to conform to a curved surface of a curved component, and adhering the first component in a forcibly flexed configuration to the curved surface of the curved component; and then forcibly flexing a second component of the display device to conform to an outer surface of the first component, and adhering the second component in a forcibly flexed configuration to the first component; wherein the first and second components each comprise one or a combination of two or more of the following: a touch sensor component or a component film of a touch sensor component; one or more of a pair of orthogonal polariser sheets for use with a liquid crystal cell; a liquid crystal cell comprising liquid crystal material contained between two containing films; one or more encapsulation films; one or more diffuser sheets; a backlight component for use with a liquid crystal cell; a light-emitting diode unit; and a circular polariser component, or a component film thereof, for use with a light-emitting diode unit.

According to one embodiment, said curved surface comprises a concave surface.

According to one embodiment, said curved surface comprises a convex surface.

According to one embodiment, said curved surface comprises a combination of one or more concave portions and one or more convex portions.

According to one embodiment, forcibly flexing said first component to said curved surface of said curved component comprises successively flexing increasingly distal portions of said first component to increasingly distal portions of said curved component.

According to one embodiment, successively flexing increasingly distal portions of said first component to increasingly distal portions of said curved component comprises successively pressing together said increasingly distal portions of said first component and said increasingly distal portions of said curved component in a direction parallel to the respective local normal of said increasingly distal portions of said curved component.

There is also hereby provided a method comprising: assembling a display device as described above, and then forcibly flexing said display device to conform to a curved surface of a second curved component having a smaller radius of curvature than the first curved component.

According to one embodiment, the second curved component is a cylindrical component, and the display device is laminated to the second curved component so as to extend substantially 360 degrees around the second curved component.

According to one embodiment, said curved component comprises a relatively flexible window/cover component supported on a curved surface of a relatively rigid temporary carrier.

According to one embodiment, the method comprises: forcibly flexing a first polariser component to conform to the curved surface of the curved component and adhering the first polariser sheet in the forcibly flexed configuration to the curved surface of the curved component; subsequently forcibly flexing a liquid crystal display cell component to conform to a curved surface of the first polariser component and adhering the liquid crystal display cell component in the forcibly flexed configuration to the curved surface of the first polariser component; forcibly flexing a second polariser component to conform to a curved surface of the liquid crystal display cell component and adhering the second polariser sheet in the forcibly flexed configuration to the curved surface of the liquid crystal display cell component.

There is also hereby provided a method of assembling a display device, comprising: forcibly flexing a first component to conform to a curved surface of a curved component, and adhering the first component in a forcibly flexed configuration to the curved surface of the curved component; wherein forcibly flexing said first component to said curved surface of said curved component comprises successively pressing together increasingly distal portions of said first component and respective increasingly distal portions of said curved component in a pressing direction parallel to the respective local normal of said increasingly distal portions of said curved component.

There is also hereby provided a method of producing a curved display device, comprising: subjecting an outer component to one or more surface treatments in a flat configuration; converting the natural configuration of the outer component to a curved configuration; and then laminating one or more other display device components to the outer component in the curved configuration.

According to one embodiment, the surface treatments comprise applying one or more coatings to a surface of the outer component and/or printing a surface of the outer component.

According to one embodiment, said converting comprises thermoforming.

Embodiments of the present invention are described in detail hereunder, by way of example only, with reference to the accompanying drawings, in which:

FIGS. 1(a) to 1(i) illustrates an example of a technique according to an embodiment of the present invention;

The examples described in detail below involve the production of a LCD display device, but the same kind of technique is equally applicable to the production of a LED display device (such an organic light emitting diode (OLED) device) which may comprise a plurality of individual components including a light-emitting component (including the light-emitting material and control circuitry) and one or more of a circular polariser component, a touch sensor component, and one or more encapsulation films.

The example techniques described below involve the production of a display device in which the convex surface of a curved window/cover component 2 forms the outer, viewing surface of the display device. However, the same kind of technique is equally applicable to display devices having other configurations.

Also, the example techniques described below involve the production of a display device having a relatively simple curved configuration (having a single axis of curvature), but as described in more detail later, the same kind of technique is equally applicable to production of display devices having more complex curved configurations such as e.g. configurations having a combination of one or more concave portions and one or more convex portions.

Also, the example techniques described below involve the configuration of an example of a plurality of components in an example order; but the techniques are equally applicable to: the configuration of the same components in other orders (to the extent that their respective functions are maintained); and/or the addition of one or more extra components; and/or the omission/replacement of one or more components.

FIG. 1 shows one example of a set of individual LCD components for sequential lamination to a window/cover component, but as discussed below, other examples may involve the sequential lamination of other individual components such as a touch sensor module and/or one or more separate encapsulation layers (that are an outer integral part of the LC cell component in the example of FIG. 1) that protect sensitive parts of the LC cell component against the ingress of e.g. moisture.

The individual flexible LCD components 6, 8, 10 that are sequentially applied, to the window/cover component 2 in the example of FIG. 1 are each produced in a flat natural/resting configuration, wherein the natural/resting configuration of a component is the configuration that the component tends to adopt in the absence of external forces; application of an external force is required to flex each of the individual LCD components out of a flat configuration, and retain each of them in a flexed configuration.

Figure 1A:

With reference to FIG. 1(a), a window/cover component 2 initially comprises a sheet of transparent plastic (e.g. an acrylic sheet) whose natural configuration is flat, i.e. the window/cover component 2 tends to adopt a substantially flat configuration in the absence of any application of external forces to the window/cover component 2. The surface of the window/cover component 2 that is to form the outer, viewing surface of the display device is then subject to one or more treatments to produce one or more coatings (e.g. spray coatings) such as e.g. one or more of a scratch-resistant hard coating, an anti-glare coating, and an anti-reflection coating. In particular, a heavy matt, anti-glare coating can greatly enhance the display viewing experience when the product display device is used in highly directional external lighting conditions. The window/cover component 2 may also, for example, be printed with paint in one or more regions while in the flat configuration, such as the printing of opaque back paint outside the display area to hide internal structure (e.g. routing lines etc.) of the display device outside the display area. Performing these treatments while the window/cover component 2 is in a flat configuration facilitates the production of high quality coatings and/or precise printing.

Figure 1B:
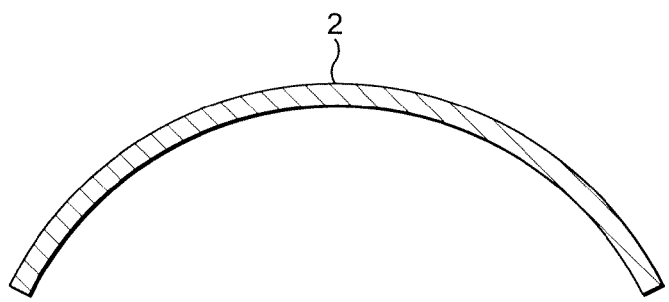

With reference to FIG. 1b, the resting (natural) configuration of the window/cover component 2 is then changed to a curved configuration by e.g. thermoforming, which involves heating the plastic window/cover component 2 to a pliable forming temperature, and forming the heated component to the desired shape e.g. using a mould. In this example, the window/cover component 2 has a thickness of no more than about 0.3 mm, which facilitates thermoforming of the window/cover component 2 even after a scratch-resistant hard coating is applied to the outer surface of the window/cover component 2.

Another example of a technique for producing a plastics window/cover component 2 with a curved resting configuration involves bonding one surface area of a first plastics film sub-component (e.g. hard-coated, planar acrylic sheet) to a smaller surface area of a second plastics film sub-component (e.g. another hard-coated planar acrylic sheet of the same thickness), by e.g. flexing one of the plastics film sub-components into a stressed curved configuration using the lamination aid 4 described below, and bonding the other of the plastics film sub-components to it in situ on the lamination aid 4. This alternative technique yet further facilitates the production of curved window/cover component with a hard coating, without needing to coat a curved surface.

As mentioned above, the natural/resting configuration of the window/cover component 2 is a curved configuration; the window/cover component tends to adopt a curved configuration in the absence of external forces; in other words, an external force would be required to flex the window/cover component away from its curved configuration to e.g. a planar configuration. When the window/cover component is forcibly flexed away from its curved, resting configuration, internal stresses are generated within the window/cover component that act to return the window/cover component back to its curved resting configuration.

Figure 1C:
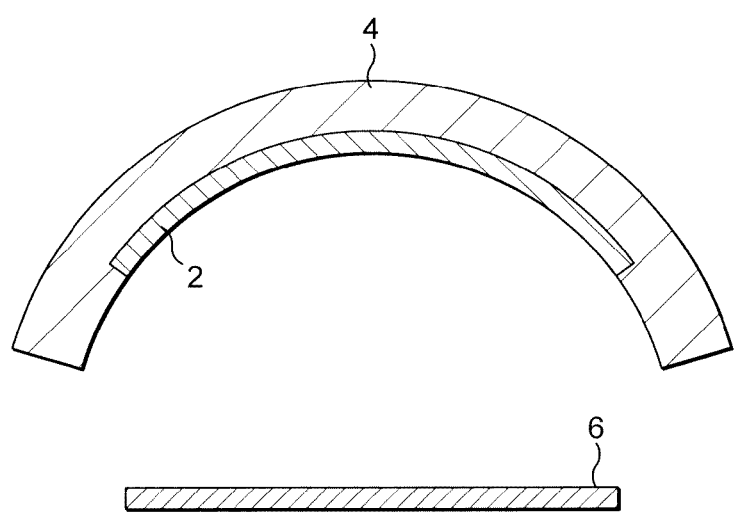

With reference to FIG. 1c, the curved window/cover component 2 is then temporarily secured to (or retained on, in the case of the alternative technique mentioned above for producing a curved window/cover component 2) the curved inner surface of a rigid or semi-flexible lamination aid 4 (at least more rigid than the window/cover component 2), which lamination aid 4 serves to retain the curved window/cover component 2 in the desired curved configuration and provides mechanical support during the process of sequentially laminating the LCD components to the curved window/cover component 2. In an alternative example in which the window/cover component 2 is thicker and/or has more structural integrity, and is sufficiently resilient by itself to retain the desired configuration in reaction to the external forces applied to it during the lamination processes, the lamination aid 4 may be omitted.

Figure 1D:
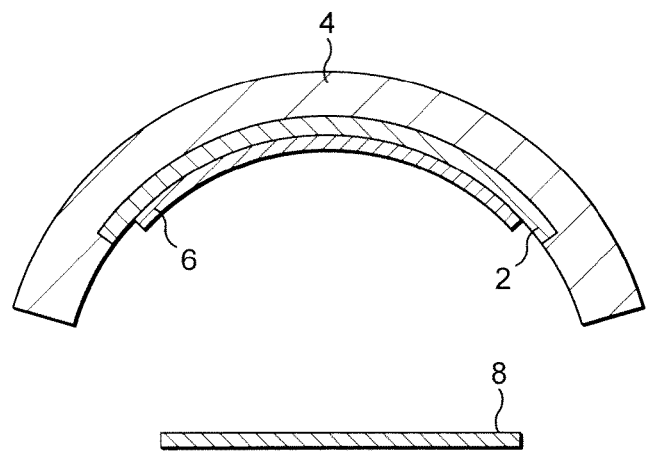

Next, with reference to FIG. 1*d*, a first flexible polariser sheet 6 having, in this example, a flat resting configuration and an overall thickness of about 60 microns is forcibly flexed and laminated to the inner, concave surface of the curved window/cover component 2. As shown in FIG. 1*d*, the polariser sheet 6 may not occupy the whole area of the curved window/cover component 2. A layer of pressure-sensitive adhesive (not shown) pre-applied to the polariser sheet 6 secures the polariser sheet 6 to the curved window/cover component 2 as the polariser sheet 6 is laminated to the curved window/cover component 2.

Figure 1E:
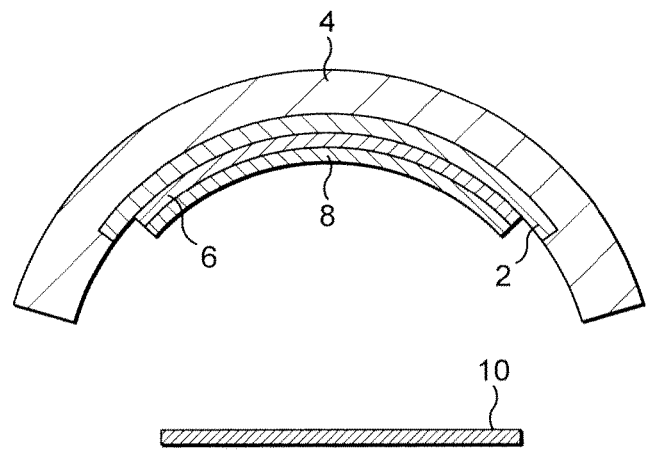

Next, with reference to FIG. 1*e*, a LC cell component 8 also, in this example, having a flat resting configuration and a total thickness of about 140 microns is forcibly flexed and laminated to the concave surface of the first polariser sheet 6. A layer of pressure-sensitive adhesive (not shown) pre-applied to the concave surface of the first polariser sheet 6 secures the LC cell component 8 to the first polariser sheet 6 as the LC cell 8 is laminated to the first polariser sheet 6. The LC cell component 8 comprises a thickness of liquid crystal material contained between (i) a first flexible support film supporting e.g. a stack of layers defining pixel electrodes and TFT circuitry to control the electrical potential at the pixel electrodes, and one or more driver chips; and a second flexible support film. Spacers between the two support films facilitate a highly uniform thickness of LC material across the whole display area; the spacers may, for example, be formed on one of the support films containing the liquid crystal material. The stack of layers defining pixel electrodes and TFT circuitry may e.g. comprise organic insulator and semiconductor layers and metal conductor layers. In this example, the LC cell 8 component also comprises outer encapsulation films/layers to protect sensitive elements of the LC cell against the ingress of moisture from an external environment, but as mentioned below, protection against ingress of moisture may be alternatively achieved by laminating encapsulation films separately to the LC cell.

In the example of FIG. 1, the edges of the LC cell component 8 after lamination to the first polariser sheet 6 substantially align with the edges of the first polariser sheet 6.

Figure 1F:
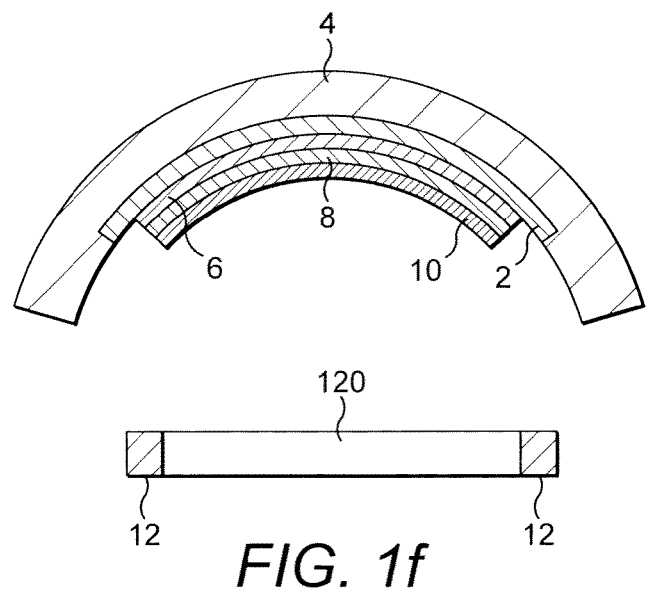

Next, with reference to FIG. 1*f*, a second polariser sheet 10 having, in this example, a flat resting configuration and an overall thickness of about 60 microns is forcibly flexed and laminated to the concave surface of the LC cell component 8. A layer of pressure-sensitive adhesive (not shown) pre-applied to the second polariser sheet 10 secures the second polariser sheet 10 to the LC cell component 8 as the second polariser sheet 10 is laminated to the LC cell component 8. Again, in this example, the edges of the second polariser sheet 10 substantially align with the edges of the LC cell component 8.

Figure 1G:
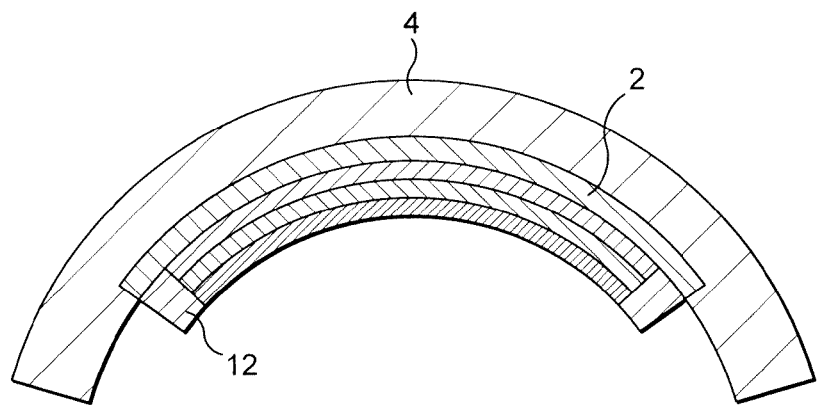

With reference to FIG. 1*g*: In this example in which the stack of polariser sheets 6, 10 and LC cell component 8 do not occupy the whole area of the window/cover component 2, a gasket component 12 defining a hole to precisely receive the stack of polariser sheets and LC cell is laminated to the uncovered, peripheral areas of the window/cover component 2 to create a monolithic unit having a substantially uniform thickness over the whole area of the window/cover component 2.

Figure 1H:
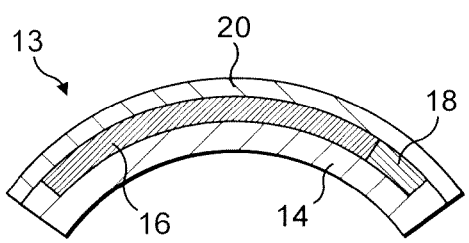

With reference to FIG. 1*h*: separately, a relatively rigid curved former 14 defines a recess configured to house a backlight unit produced in a flat configuration and comprising one or more edge light sources 18 and a light guide plate component 16. The light guide plate component 16 receives light from the edge light sources 18, directs the received light across the light guide component 16, and releases an increasingly large proportion of the propagated light from an upper surface of the light guide plate component 16 as the light propagates across the light guide component 16 from the light sources 18. The light guide plate component 16 thus distributes light from the edge light sources 12 out from the upper surface of the light guide plate component 16 at a substantially uniform intensity over the whole area of the light guide plate component 16. The curved former 14 is designed such that the upper surface thereof is substantially flush with the upper surface of the backlight unit housed in the curved former 14. A diffuser sheet 20 having a flat resting configuration is forcibly flexed and laminated to the upper surface of the curved former 14 at the edges outside the recess housing the backlight unit. Pressure-sensitive adhesive (not shown) applied to the diffuser sheet 20 secures the diffuser sheet 20 to the curved former 14 as the diffuser sheet 20 is laminated to the curved former 14. In addition to its optical function, the diffuser sheet 20 additionally serves to retain the backlight unit in a curved configuration within the recess in the curved former 14.

Figure 1I:
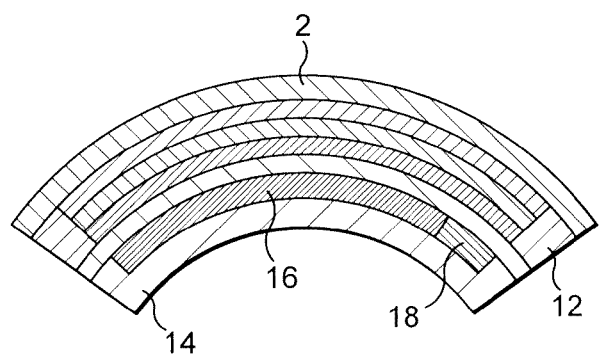

Finally, with reference to FIG. 1*i*, the laminated unit of FIG. 1*g* is released from the lamination aid 4 and is laminated to the unit 13 of FIG. 1*h*. Pressure sensitive adhesive (not shown) applied to the second polariser sheet 10 and the gasket 12 and/or to the diffuser sheet 20 secures the laminated unit of FIG. 1*g* to the unit 13 of FIG. 1*h* as it is laminated to the unit of FIG. 1*h*. According to one variation, an edge frame portion of the curved window/cover is left uncovered by the gasket 12, and an edge frame portion of the curved former 14 is left uncovered by the diffuser sheet; and these edge frame portions of the window/cover component 2 and the curved former 14 are adhesively bonded directly to each other.

In this example of FIG. 1, encapsulation of sensitive parts of the LC cell against the ingress of moisture is achieved by encapsulation films/layers forming an integral, outer part of the LC cell component 8 that is laminated to the curved window/cover 2 via the first polariser sheet 6. However, according to one example variation, encapsulation films are separately laminated to the curved window/cover component 2. For example, the lamination sequence may comprise the following sequence: flex and laminate a first flat encapsulation film to a curved surface of the curved window/cover component 2; flex and laminate a flat first polariser sheet 6 to the curved surface of the first encapsulation film; flex and laminate the flat LC cell component 8 to a curved surface of the first polariser sheet 6; flex and laminate a flat second polariser sheet 10 to the curved surface of the LC cell component 8; and flex and laminate a flat second encapsulation film to the curved surface of the second polariser sheet 10. In this example variation, the sequential lamination of the two polariser sheets 6, 10 and LC cell component 8 to the window/cover component 2 may be replaced by producing a LC display module comprising an assembly of two orthogonal polariser sheets and a LC cell in a flat configuration and forcibly flexing and laminating the LC display module to the curved window/cover component 2 (via the first encapsulation film) in a single lamination operation.

In another example variation, a flat touch sensor module is first forcibly flexed and laminated to the curved window/cover component 2, before the lamination sequence illustrated in FIG. 1. In this example variation, the sequential lamination of the two polariser sheets 6, 10 and LC cell component 8 to the window/cover component 2 may be replaced by producing a LC display module comprising an assembly of two orthogonal polariser sheets and a LC cell in a flat configuration and forcibly flexing and laminating the flat LC display module to the curved touch sensor component (itself laminated to the curved window/cover component 2) in a single lamination operation. The lamination of the touch sensor component to the curved window/cover component may itself involve the sequential lamination of two component films of the touch sensor component. Another example variation involves: (a) producing a curved window component from two planar plastics film sub-components (e.g. hard-coated planar acrylic sheets) according to the alternative technique mentioned above; (b) preparing at least two planar plastics film components, each comprising two or more plastics film sub-components bonded together in planar resting configurations; and then sequentially laminating the at least two planar plastics film components to the curved window component. For example, one of the two planar plastics film components may comprise a top one of the two polariser sheets (and e.g. an adhesive film, a painted window film and an encapsulation film) and the other of the two planar plastics film components may comprise the LC cell and the bottom one of the two polariser sheets (and e.g. another encapsulation film).

Figure 3:
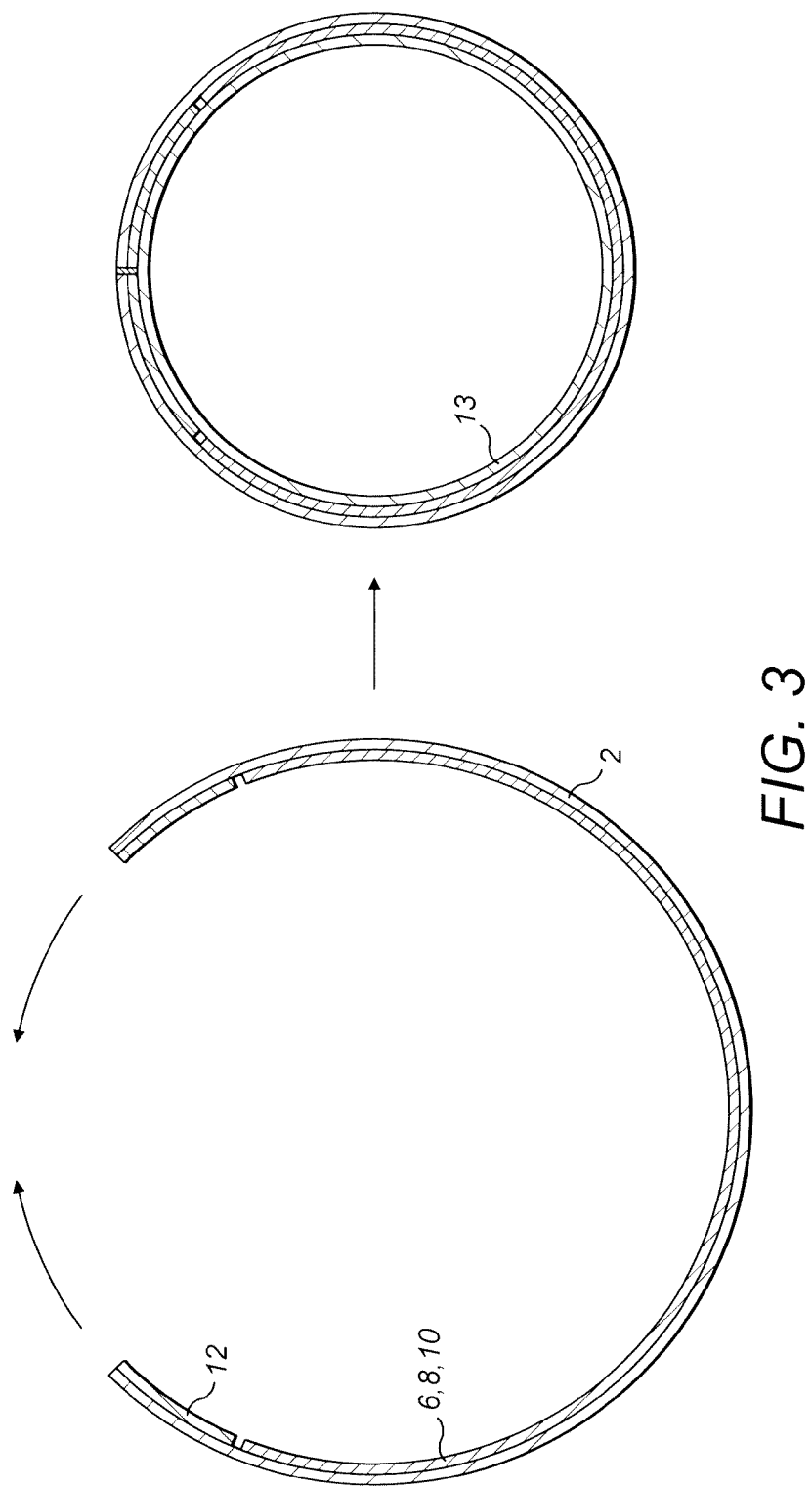
FIG. 3 illustrates the application of the technique of FIG. 1 to the production of a cylindrical display unit.

The sequential lamination process described above involving forcibly flexing and laminating flat display components in sequence to a curved surface, may be followed by forcibly flexing and laminating the resulting curved unit as whole to another curved surface with a smaller radius of curvature. For example, the convex outer surface of the unit of FIG. 1h may have a smaller radius of curvature than the concave inner surface of the laminated unit of FIG. 1g; and one example technique involves forcibly flexing the laminated curved unit of FIG. 1g as a whole to laminate the laminated curved unit of FIG. 1g to the unit of FIG. 1h. This combination of techniques, i.e. the sequential forcible flexing-lamination of display components to a concave surface of a curved window/cover component 2 followed by forcible flexing-lamination of the resulting laminated assembly to a convex surface having a smaller radius of curvature may, for example, facilitate the production of substantially 360 degree displays, such as displays that extend substantially 360 degrees around a cylindrical object, as shown in FIG. 3, in which the former 14 of unit 13 is a hollow cylinder, and the laminated unit of FIG. 1g is laminated substantially 360 degrees around the cylindrical unit 13. This combination of techniques may be particularly advantageous when using a vacuum lamination technique to produce the flexible, laminated assembly.

In an example in which the former 14 of FIG. 1 comprises e.g. a hollow cylinder with a through hole for connectors from the display device to the interior of the cylinder (e.g. drive electronics located at the interior of the cylinder), the technique may comprise providing some mechanical support (padding) in the region of the through hole (after the connectors are in place) to provide a more uniformly mechanically responsive surface for the lamination of the curved unit of FIG. 1g (and thus more evenly spread any force applied to the unit of FIG. 1g), particularly in the example that the curved window/cover component 2 is relatively thin, having relatively little structural integrity and significantly deformable under the pressing action of a user finger.

Figure 2:
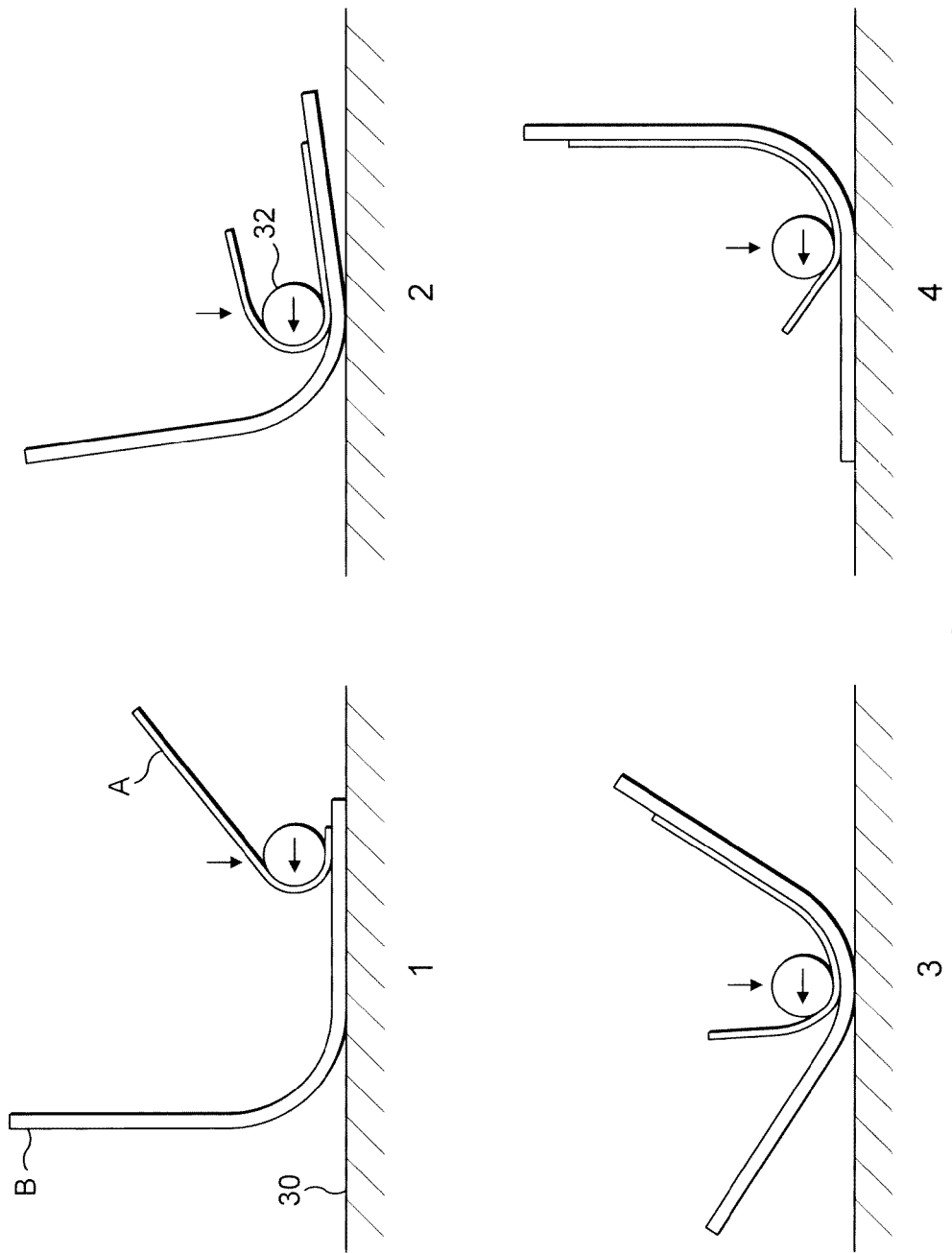
FIG. 2 illustrates an example of a technique for laminating a component to a curved surface in the technique of FIG. 1.

The forcible flexing of each individual component to conform to the concave surface of the individual component preceding it in the lamination sequence may, for example, be carried out by a vacuum forming lamination technique or a roller lamination technique of the kind illustrated in FIG. 2. FIG. 2 shows a roller lamination technique for the example of forcibly flexing and laminating a first individual component A to the surface of a curved support B.

The curved support component B (which may, for example comprise the combination of the laminated aid 4 and curved window/cover component 2 of FIG. 1) rests on a planar base 30 for free rotation over the surface of the planar base 30. An edge portion of the first component A (which may for example be the first polariser sheet in FIG. 1) and a corresponding portion of the curved support component B are then forcibly sandwiched between an upper surface of the planar base 30 and a lamination roller 32, by applying a force to the lamination roller 32 in a direction (shown by red arrow in FIG. 2) perpendicular to the upper surface of the planar base 30. While continuing to apply a force to the roller in a direction perpendicular to the upper surface of the planar base, the roller 14 is moved over the upper surface of the planar base 12 (in a direction parallel to the upper surface of the planar base 12, as indicated by the black arrow shown inside the circle indicating the roller 14), so as to forcibly sandwich together successively increasingly distal portions (distal from the starting edge of the component A, and respective corresponding portions of the curved support component B. As mentioned above, the curved support component B is free to rotate over the upper surface of the planar base 30, and does rotate over the upper surface of the planar base 30 under the action of the lamination roller 32 moving over the upper surface of the planar base 30, such that the local normal of the portion of the component A in contact with the roller 32 at any time (and also the local normal of the respective portion of the curved support component B) is always substantially perpendicular to the upper surface of the planar base 30, such that the pressure applied by the lamination roller 32 and planar base 30 to component A and the curved support component B always acts in a direction substantially perpendicular to the respective portion of the component A and corresponding portion of the curved support component B.

A layer of adhesive pre-applied to component A and/or to component B serves to adhere the successive portions of component A to respective portions of the curved support component B as the lamination roller 32 moves over the planar base 30.

According to one variation, the orientation of the curved support component B relative to the roller 14 (by moving one or more of the curved support component B and the roller 14) during the lamination process may be more actively controlled (e.g. by a mechanism working automatedly in time with the movement of the roller across the planar base 30) to achieve the desired change in orientation of the curved support component 2 and/or the roller 14 as successive portions of the curved support component 2 and component A are laminated together. In one example, the roller 14 is mounted on a robotic arm which changes the orientation of the roller 14 (more particularly, the machine element that pushes the roller 14) relative to the curved support component B such that the roller 14 is always pressed against the curved support component in a direction normal to the surface of the curved support component B.

As mentioned above, the technique described above is equally applicable to the production of curved display devices having more complex configurations. For example, the curved configuration shown in FIG. 1 has only a single axis of curvature, which does not intersect with any edge of the above-mentioned driver chip(s) forming part of the LC cell component 8; but alternative curved configurations may have a plurality of axes of curvature that may be parallel to each other or may or not be parallel to each other, but do not intersect with each other or with any edge of any driver chip forming part of the LC cell component 8. For configurations having multiple axes of curvature, the curvature direction may be the same for each axis of curvature, or there may be changes in the curvature direction at one or more axes of curvature to form e.g. an S-shaped configuration.

FIGS. 4a to 4f illustrate another example of a technique according to another embodiment. The technique of FIGS. 4a to 4f also involves the sequential lamination of a plurality of substantially planar components to the curved window/cover component 2 used in the technique of FIG. 1, to produce a device having a curved configuration. The rigid lamination aid 4 is not shown in FIGS. 4a to 4f. The term "plastics film component" refers to a component comprising at least one or more plastics films.

A first plastics film component 40 having touch sensor functionality is prepared in a substantially planar resting configuration, and bonded to the curved window/cover component 2 in a stressed configuration. The first plastics film component 40 is resiliently flexible; when the plastics film component 40 is forcibly flexed away from its planar resting configuration, internal stresses are generated within the first plastics film component 40, which act to return the first plastics film component 40 to its planar resting configuration. The strength of the adhesive bond between the curved window/cover component 2 and the first plastics film component 40 and/or the bending stiffness of the curved window/cover component 2 is sufficient to hold the curved window/cover component 2 and the first plastics film component 40 in a curved configuration, against the tendency of the first plastics film component 40 to relax back to its planar resting configuration.

The touch sensor component 40 does not occupy the whole area of the curved window cover component 2. A first gasket component 52 (also prepared in a substantially planar configuration) is also bonded to the curved window/cover component 2, so as to frame the touch sensor component 40 and substantially cover all areas of the inner surface of the curved window/cover component 2 not covered by the touch sensor component 40, except for a space to accommodate electrical connectors 58 from the touch sensor component 40 to the rear of the device. The first gasket component 52 defines a window 520 that fits around the touch sensor component 40. The bonding of the touch sensor component 40 and the gasket component 52 to the curved window/cover component 2 may, for example, involve dry bond lamination techniques.

A second plastics film component 42 having optical modulation functionality is prepared in a substantially planar resting configuration, and bonded to the curved window/cover component 2 via the touch sensor component 40. The second plastics film component 42 is also resiliently flexible; when the second plastics film component 42 is forcibly flexed away from its planar resting configuration, internal stresses are generated within the second plastics film component 42, which act to return the second plastics film component 42 to its planar resting configuration. The bending stiffness of the intermediate assembly and/or the strength of the adhesive bond between the intermediate assembly and the second plastics film component 42 is sufficient to hold the resulting assembly in a curved configuration against the tendency of the second plastics film component to relax back to its planar resting configuration.

In this example, the second plastics film component 42 comprises a set of three pre-prepared plastics film sub-components: a lower polarising filter component 132; a liquid crystal cell incorporating electrical control circuitry and a colour filter array, and pre-bonded to a chip-on-flex (COF) unit; and an upper polarising filter component 130. In this example, all three sub-components are prepared in respective substantially planar resting configurations and bonded together in their planar resting configurations, before bonding the bonded assembly to the curved window/cover component 2 via the touch sensor component 40. According to one variation, the pre-prepared individual plastics film sub-components are bonded together in situ on the curved window/cover component 2. In more detail, each plastics film sub-component of the set of sub-components is bonded in sequence to the curved window/cover component 2, via any of the plastics film sub-component(s) that has already been bonded to the curved window/cover component 2. Each bonding may, for example, be achieved by a dry bond lamination technique.

An example of the second plastics film component 42 is schematically illustrated in FIG. 3. A stack 114 of conductor, semiconductor and insulator layers is formed in situ on a plastics support film 116. The stack 114 defines an array of pixel electrodes 118, and electrical circuitry for independently controlling each pixel electrode via conductors outside the array of pixel electrodes 118. The stack 114 may, for example, define an active matrix array of thin-film transistors, including: an array of gate conductors each providing the gate electrode for a respective row of TFTs, and extending to outside the array of pixel electrodes; and an array of source conductors each providing the source electrode for a respective column of TFTs, and extending to outside the array of pixel electrodes. Each pixel electrode is associated with a respective TFT, and each TFT is associated with a unique combination of gate and source conductors, whereby each pixel electrode can be addressed independently of all other pixels.

A substantially uniform thickness of liquid crystal material 120 is contained between the array of pixel electrodes 118 and a counter component 122 comprising an array of colour filters supported on another plastics support film. A COF unit 124 is bonded to a portion of the support film 116 outside the array of pixel electrodes 118 to create a conductive connection between (i) an array of conductors (e.g. source and gate addressing conductors) defined by the stack 114 in a region outside the array of pixel electrodes 118 and (ii) a corresponding array of conductors of the COF unit, which are connected to the terminals of one or more driver chips 126 forming part of the COF unit.

As shown in FIGS. 4a to 4f, the optical modulator component 42 also does not occupy the whole area of the curved window/cover component 2. A second gasket component 54 (also prepared in a substantially planar configuration) is also bonded to the curved window/cover component 2 via the first gasket component 52, so as to frame the optical modulator component 42 and substantially cover all areas of the inner surface of the curved window/cover component 2 not covered by the optical modulator component 42, except for a space to accommodate electrical connectors 58 from the optical modulator component 42 (and the touch sensor component 40) to the rear of the device. The second gasket component 54 defines a window 540 that fits around the optical modulator component 42. The bonding of the optical modulator component 42 and the second gasket component 54 to the curved window/cover component 2 may, for example, involve dry bond lamination techniques.

A third plastics film component 44 having optical diffuser functionality is prepared in a substantially planar resting configuration, and bonded to the curved window/cover component 2 via the touch sensor component 40, the optical modulator component 42 and the above-mentioned gasket components 52, 54. The diffuser component 44 extends to all edges of the curved window/cover component 2, but defines through holes through which electrical connectors 58 from the touch sensor component 40 and optical modulator component 42 pass to the rear of the device. The bonding of the diffuser component 44 and the second gasket component 54 to the curved window/cover component 2 may, for example, involve dry bond lamination techniques. A fourth plastics film component 46 having backlight functionality is prepared in a substantially planar resting configuration, and applied (with or without bonding) to the curved window/cover component 2 via the touch sensor component 40, optical modulator component 42 and diffuser component 44. The backlight component 46 also does not occupy the whole area of the curved window/cover component 2. A third gasket component 56 (also prepared in a substantially planar resting configuration) is bonded to the curved window/cover component 2 via the first and second gasket components, so as to frame the backlight component 46 and substantially cover all areas of the inner surface of the curved window/cover component 2 not covered by the backlight component 46, except for a space to accommodate electrical connectors 58 from the backlight component 46 (and also the touch sensor component 40 and optical modulator component 42) to the rear of the device. The third gasket component 56 defines a window 560 that fits around the backlight component 46.

A fifth plastics film component 48 providing rear cover functionality is prepared in a substantially planar resting configuration, and bonded to the curved window/cover component 2 via at least the touch sensor component 40, the optical modulator component 42, the diffuser component 44, and the above-mentioned gasket components 52, 54, 56. The rear cover component 48 extends to all edges of the curved window/cover component 2, but defines a through hole 480 through which electrical connectors 58 from the touch sensor component 40, optical modulator component 42 and backlight component 46 pass to the rear of the device. The bonding of the rear cover component 48 and the second gasket component 56 to the curved window/cover component 2 may, for example, involve dry bond lamination techniques. In one example: the backlight component 46 is not bonded to the curved window/cover component 2 (via the touch sensor component 40, optical modulator component 42 and diffuser component 44), and the rear cover component 48 functions to hold the backlight component 46 in a curved configuration behind the curved window/cover component 2; and/or the backlight component 46 comprises a plurality of loosely assembled sub-components without any bond therebetween, and the rear cover component 48 functions to prevent the plurality of sub-components that constitute the backlight component 46 from falling apart. In one example, this rear cover component 48 also functions as a heat sink. In one example, the rear cover component comprises a reinforced metal foil.

According to one example variation: a planar plastics film rear cover component 48 is temporarily mounted in a stressed, curved configuration on the convex surface of another curved lamination aid: a plastics film gasket component is bonded to the rear cover component in situ on the curved lamination aid; insert a backlight component into a window defined by the gasket component; the planar diffuser component 44 is bonded to the rear cover component 48 via the gasket component, in situ on the curved lamination aid; the resulting curved bonded assembly is removed from the curved lamination aid and bonded to the curved window/cover component 2 via the touch sensor component 40, the optical modulator component 42 and the above-mentioned gasket components 52, 54.

A film of (e.g. pressure-sensitive) adhesive 50 (also prepared in a substantially planar resting configuration) is applied to the rear surface of the rear cover component 48 to facilitate the application of the device to an object surface. The film of adhesive 50 extends to all edges of the curved window/cover component 2, but defines a through hole through which electrical connectors 58 from the touch sensor component 40, optical modulator component 42 and backlight pass to the rear of the device. The adhesive film 50 may be protected by a releasable liner (not shown) to protect the adhesive film 50 before it is used to bond the device to an object surface.

The vacant space around the electrical connectors 58 in the spaces/through holes left to accommodate the electrical connectors 58 from the touch sensor component 40, optical modulator component 42 and backlight component 46 is filled with a sealant 60. The sealant 60 ensures that any forces applied to the curved window/cover component 2 in the region of these electrical connectors 58 is translated through the above-mentioned stack of components behind the curved window/cover component 2, and do not damage the curved window/cover component 2 and/or the electrical connectors 58.

The use of the gasket components 52, 54, 56 and the sealant provides a device that is substantially monolithic in terms of thickness and user feel across the whole area of the curved window/cover component 2. The adhesive bonds between the components bonded together in stressed, curved configurations are sufficiently strong to hold the resulting bonded assembly in a curved configuration, against the tendency of the components to relax to a planar configuration. It is not necessary for the window/cover component 2 to have a bending stiffness any greater than any of the planar plastics film components bonded in a stressed configuration to the window/cover component 2, but in one example, the window/cover component 2 does have a bending stiffness greater than any of the planar plastics film components bonded in stressed configurations to the window/cover component 2.

Figure 4A:
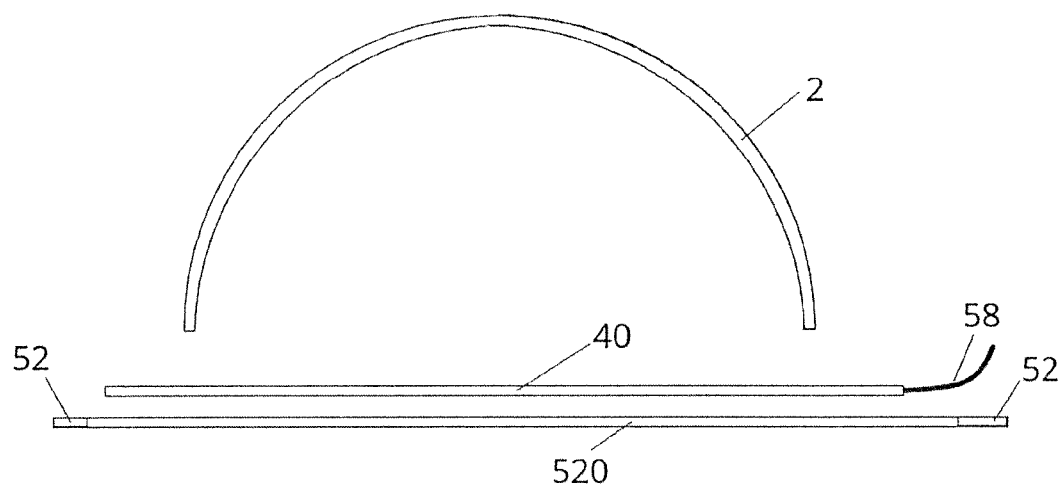
FIGS. 4a to 4f illustrate an example of a technique according to another embodiment of the present invention.
Figure 4B:
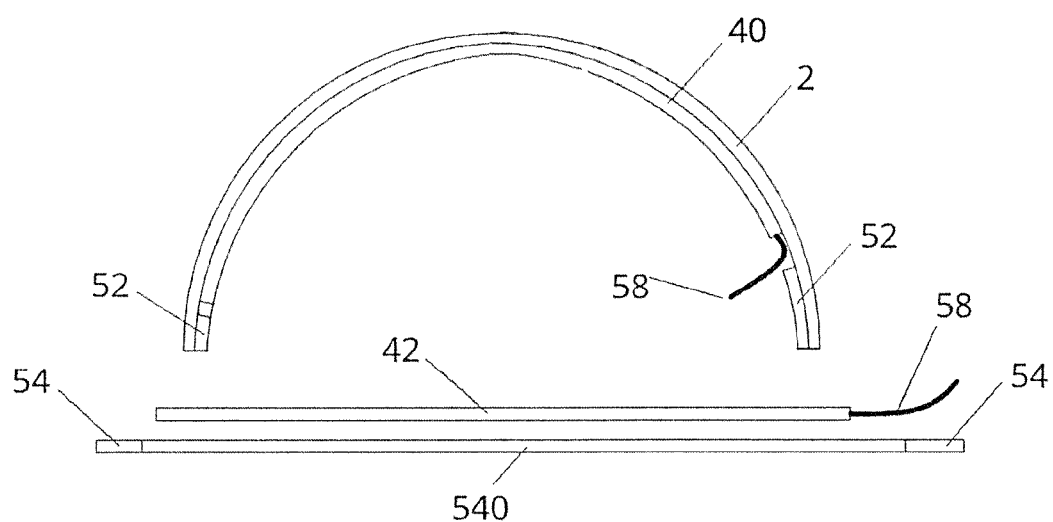
Figure 4C:
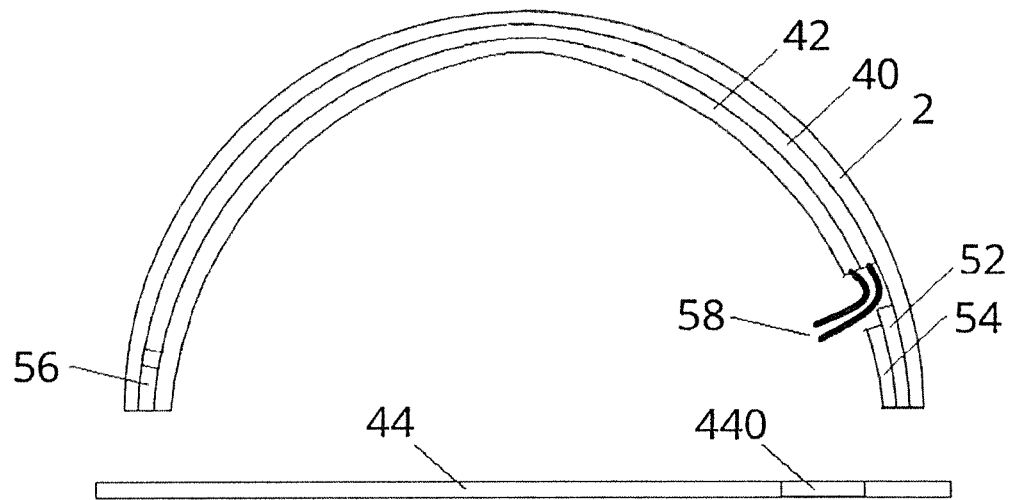
Figure 4D:
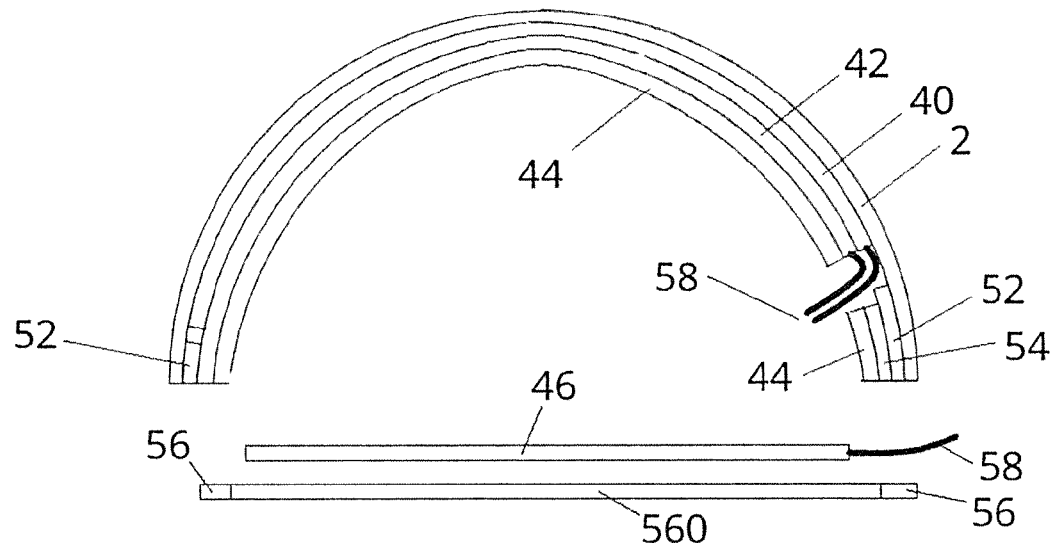
Figure 4E:
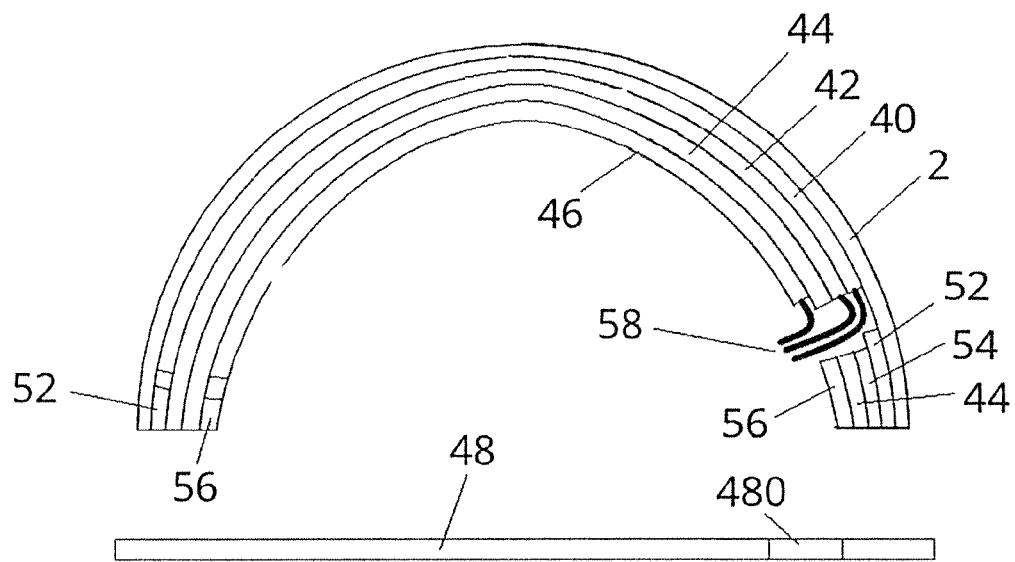
Figure 4F:
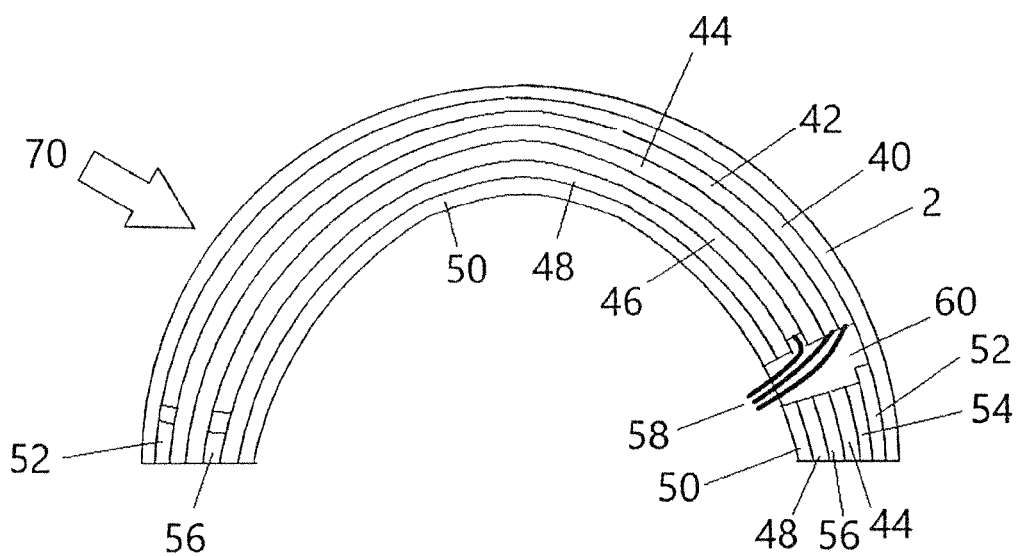

FIG. 4f shows a plurality of separate electrical connectors 50 extending beyond the rear of the device, for each of the touch sensor component 40, optical modulator component 42, and backlight component 46. In one variation example, these separate electrical connectors are organised within the device such that only a single electrical connector serving all of the touch sensor component 40, optical modulator component 42, and backlight component 46 extends from the rear of the device.

Figure 5:
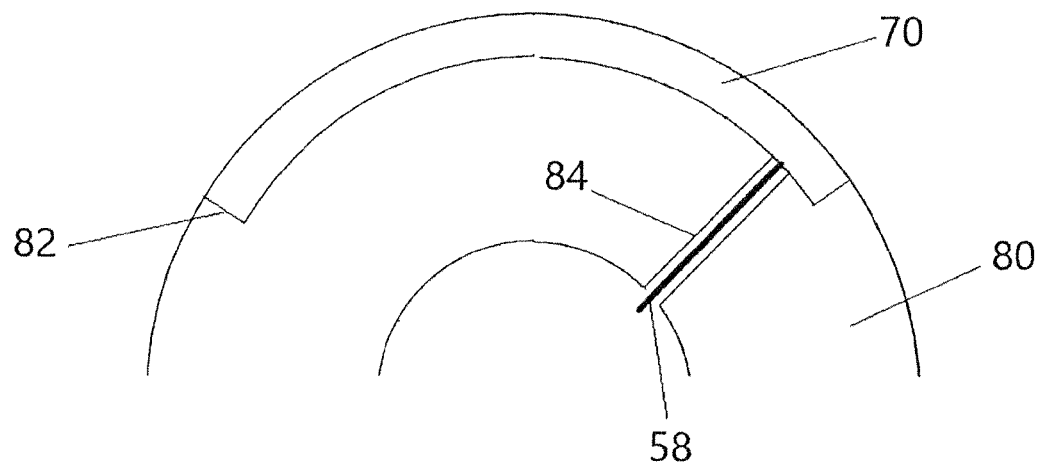
FIG. 5 illustrates the application of the product of FIG. 4f to an object surface.
Figure 6:
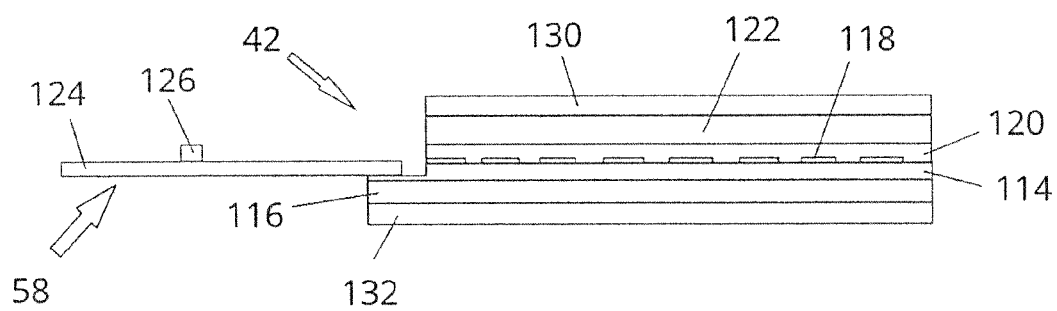
FIG. 6 illustrates an example of an optical modulator component for the technique of FIGS. 4a to 4f.

FIG. 5 shows an example of the application of the device of FIG. 4 to an object surface. In this example, the object 80 has a surface that defines a recess 82 having a depth substantially equal to the thickness of the device of FIG. 4f, and defines a through hole 84 just big enough to allow the electrical connector(s) 58 to be fed through to the rear of the object 80. The device of FIG. 4f sits within the recess 82 and is bonded to the bottom surface of the recess 82 using the adhesive film 50. In one example, the device of FIG. 4f may be designed to closely approximate the curvature of the curved object surface to which is to be applied. In another example, the device of FIG. 4f may be deliberately designed to have an inner radius of curvature that is larger than the radius of curvature of the curved object surface to which it is to be applied; this can facilitate the lamination of the device to the object surface. In another example, the device of FIG. 4f may be deliberately designed to have an inner radius of curvature that is smaller than the radius of curvature of the curved object surface to which it is to be applied; this can reduce the reliance on the adhesive film 50 to hold the device in place on the object surface, and can, for example, facilitate the use of weaker adhesives.

In one variation, the object 80 itself incorporates a backlight, and the backlight component and rear cover component are omitted from the device of FIG. 4f. The adhesive film 50 used for bonding the device to the object 80 is instead bonded to the rear of the diffuser component 44.

All of the techniques described above for the example of a curved LCD device are also applicable to the production of other kinds of curved display devices such as curved organic light-emitting diode (OLED) devices. For example, the production of a curved OLED device according to an embodiment of the present invention may, for example, comprise sequentially flexing and laminating to a curved window/cover component a flat light-emitting unit and one or more of the following components: a flat touch sensor component or component films thereof; a flat circular polariser component (comprising a linear polariser and a quarter wave plate) or component films thereof; and one or more encapsulation films to protect the light-emitting unit against the ingress of oxygen and moisture.

In addition to any modifications explicitly mentioned above, it will be evident to a person skilled in the art that various other modifications of the described embodiment may be made within the scope of the invention.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

The invention claimed is:

1. A method of assembling a display device, comprising:
    forcibly flexing a first polariser component to conform to a curved surface of a first curved component;
    adhering the first polariser component in a forcibly flexed configuration to the curved surface of the first curved component;
    forcibly flexing a liquid crystal display cell component to conform to an outer surface of the first component;
    adhering the liquid crystal display component in a forcibly flexed configuration to the first polariser component;
    forcibly flexing a second polariser component to conform to a curved surface of the liquid crystal display cell component; and
    adhering the second polariser sheet in the forcibly flexed configuration to the curved surface of the liquid crystal display cell component.

2. The method according to claim 1, wherein the curved surface comprises a concave surface.

3. The method according to claim 1, wherein the curved surface comprises a convex surface.

4. The method according to claim 1, wherein the curved surface comprises a combination of one or more concave portions and one or more convex portions.

5. The method according to claim 1, wherein forcibly flexing the first polariser component to the curved surface of the first curved component comprises successively flexing increasingly distal portions of the first polariser component to increasingly distal portions of the first curved component.

6. The method according to claim 5, wherein successively flexing increasingly distal portions of the first polariser component to increasingly distal portions of the first curved component comprises successively pressing together the increasingly distal portions of the first polariser component and the increasingly distal portions of the first curved component in a direction parallel to the respective local normal of the increasingly distal portions of the first curved component.

7. The method according to claim 5, wherein successively flexing increasingly distal portions of the first polariser component to increasingly distal portions of the first curved component comprises:
    resting the first curved component on a planar base for free rotation over the planar base; and
    successively pressing together the increasingly distal portions of the first polariser component and the increasingly distal portions of the first curved component while rotating the first curved component over the planar base.

8. The method according to claim 1, comprising forcibly flexing the display device to conform to a curved surface of a second curved component having a smaller radius of curvature than the first curved component.

9. The method according to claim 8, wherein the second curved component is a cylindrical component, and the display device is laminated to the second curved component so as to extend substantially 360 degrees around the second curved component.

10. The method according to claim 1, wherein the first curved component comprises a relatively flexible window/cover component supported on a curved surface of a relatively rigid temporary carrier.

11. The method according to claim 1, further comprising:
    forcibly flexing the display device to conform a concave inner surface of the display device to a convex outer surface of a second curved component, the convex outer surface having a smaller radius of curvature than the concave inner surface.

12. The method according to claim 11, wherein the second curved component defines a through hole extending from the convex outer surface to an interior of the second curved component; and wherein forcibly flexing the display device to conform the concave inner surface of the display device to the convex outer surface of a second curved component is done after passing connectors of the display device through the through hole, and thereafter providing mechanical support in the region of the through hole.

13. The method according to claim 12, wherein the first curved component comprises a convex surface forming the outer, viewing surface of the display device; and wherein the first curved component is deformable under the pressing action of a user finger.

14. The method according to claim 1, wherein the first curved component is deformable under the pressing action of a user finger.

15. A method of assembling a display device, comprising:
forcibly flexing a first component to conform to a curved surface of a first curved component comprising successively flexing increasingly distal portions of the first component to increasingly distal portions of the first curved component, wherein successively flexing increasingly distal portions of the first component to increasingly distal portions of the first curved component comprises resting the first curved component on a planar base for free rotation over the planar base and successively pressing together the increasingly distal portions of the first component and the increasingly distal portions of the first curved component while rotating the first curved component over the planar base
adhering the first component in a forcibly flexed configuration to the curved surface of the first curved component;
forcibly flexing a second component of the display device to conform to an outer surface of the first component; and
adhering the second component in a forcibly flexed configuration to the first component;
the first and second components each comprising at least one of i) a touch sensor component or a component film of a touch sensor component, ii) at least one polariser sheet for use with a liquid crystal cell, iii) a liquid crystal cell comprising liquid crystal material contained between two containing films; iv) at least one encapsulation film, v) at least one diffuser sheet, vi) a backlight component for use with a liquid crystal cell, vii) a light-emitting diode unit; and viii) a circular polariser component, or a component film thereof, for use with a light-emitting diode unit.

16. A method, comprising:
forcibly flexing a display device to conform a concave inner surface of the display device to a convex outer surface of a second curved component, wherein the convex outer surface of the second curved component has a smaller radius of curvature than the concave inner surface of the display device;
wherein the second curved component defines a through hole extending from the convex outer surface to an interior of the second curved component; and wherein forcibly flexing the display device to conform the concave inner surface of the display device to the convex outer surface of a second curved component is done after passing connectors of the display device through the through hole, and thereafter providing mechanical support in the region of the through hole;
wherein the display device is formed by a method comprising:
forcibly flexing a first component to conform to a curved surface of a first curved component;
adhering the first component in a forcibly flexed configuration to the curved surface of the first curved component;
forcibly flexing a second component of the display device to conform to an outer surface of the first component, and
adhering the second component in a forcibly flexed configuration to the first component; the first and second components each comprising at least one of i) a touch sensor component or a component film of a touch sensor component, ii) at least one polariser sheet for use with a liquid crystal cell, iii) a liquid crystal cell comprising liquid crystal material contained between two containing films; iv) at least one encapsulation film, v) at least one diffuser sheet, vi) a backlight component for use with a liquid crystal cell, vii) a light-emitting diode unit; and viii) a circular polariser component, or a component film thereof, for use with a light-emitting diode unit.

* * * * *